J. WHITWORTH.
PICKER CHECK.
APPLICATION FILED DEC. 22, 1914.
1,161,815.
Patented Nov. 23, 1915.
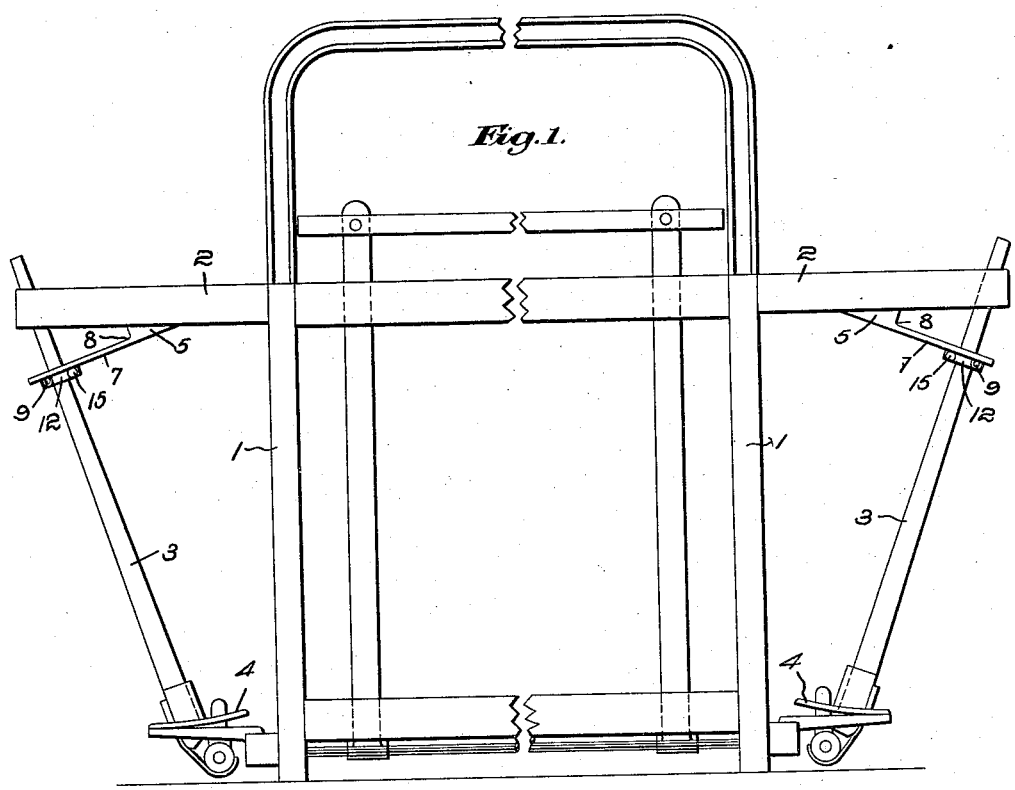
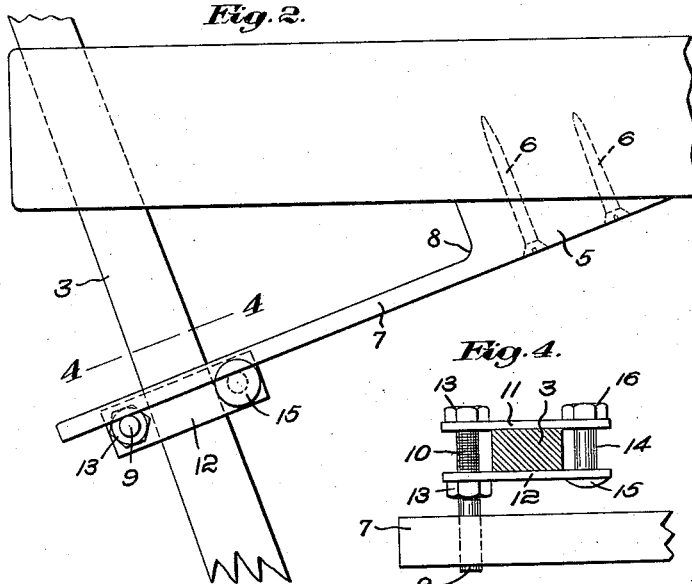
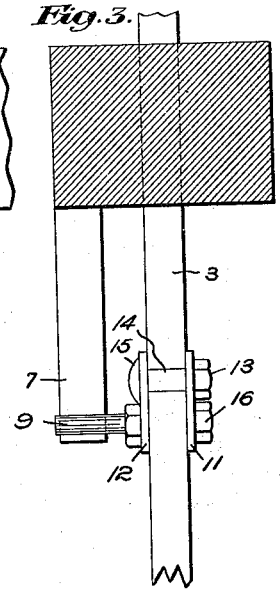
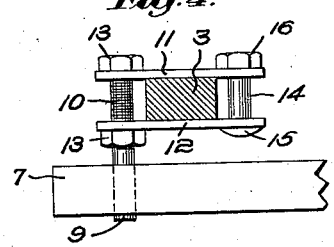
Witnesses:
Horace A. Crossman
Carl L. Choate
Inventor:
Jesse Whitworth,
by Emery, Booth, Janney and Varney,
Attys.

UNITED STATES PATENT OFFICE.

JESSE WHITWORTH, OF LAWRENCE, MASSACHUSETTS, ASSIGNOR TO JAMES K. LANNING, OF FALL RIVER, MASSACHUSETTS.

PICKER-CHECK.

1,161,815.  Specification of Letters Patent.  Patented Nov. 23, 1915.

Application filed December 22, 1914. Serial No. 878,589.

*To all whom it may concern:*

Be it known that I, JESSE WHITWORTH, a subject of the King of Great Britain, and a resident of Lawrence, in the county of Essex and State of Massachusetts, have invented an Improvement in Picker-Checks, of which the following description, in connection with the accompanying drawings, is a specification, like characters on the drawings representing like parts.

This invention relates to picker checks.

In order that the principle of the invention may be readily understood, I have disclosed a single embodiment thereof in the accompanying drawing, wherein—

Figure 1 is a front elevation of a loom having my invention applied thereto; Fig. 2 is a detail in front elevation on a larger scale showing my improved picker check; Fig. 3 is an end elevation of the construction shown in Fig. 2; and Fig. 4 is a cross section on the line 4—4 of Fig. 2.

An important object of my invention is to provide a picker check constructed and arranged to hold the picker accurately in its outward position in contact with the point of the shuttle, so that upon the inward throw of the picker stick, the shuttle is at once thrown by the picker stick without lost motion.

Other objects of the invention will be fully set forth hereinafter.

My improved picker check may be applied to any type of loom having picker sticks. I have herein shown a conventional loom having a frame 1, a race 2, and picker sticks 3. The picker sticks are adapted to be rocked in any suitable manner, and to that end are herein represented as provided with shoes 4. The picker check here shown is composed of a plurality of parts, at least one of which is mounted upon the lay and at least one of which is mounted upon the picker stick. I have herein represented each end of the lay and each picker stick as provided with coöperating parts, together constituting complete picker checks.

Adjacent each outer end of the lay I have mounted a member 5 in any suitable manner, as by means of screws or bolts 6. Each member is provided with a resilient extension or prolongation 7 which extends as shown in a path substantially parallel to the path of the picker stick and in such position as to be engaged or contacted with by a part or member formed upon or carried by the picker stick. The said member 5 and its prolongation 7 may be formed of any suitable material, but preferably I form the same of some hardwood, inasmuch as experiments have shown that the proper degree of friction is best given thereby. In order to strengthen the prolongation 7, I preferably provide the same with a fillet 8 at its inner end.

In the preferred embodiment of my invention, I secure upon each picker stick 3 a member which, in the normal movement of the picker stick and near its outer limit of its throw, is adapted to contact with the prolongation 7, and by reason of the frictional engagement therewith to bring the picker stick to a position of rest with the point of the shuttle in contact therewith. While for this purpose, the picker stick may have a part or member formed integrally therewith, I preferably adjustably mount upon the picker stick a member 9 here shown as a metallic pin or stud threaded at one end as indicated at 10 and adapted loosely to receive thereon two plates 11, 12 positionable at opposite face of the picker stick 3. The said plates 11 and 12 may be tightened in any position of desired adjustment by nuts 13. In order effectively to hold the said bolts in position, I preferably provide a bolt 14 having a head 15 and a threaded end upon which is mounted a nut 16. In this or in any other suitable manner, the member 9 may be secured at the desired height upon the picker stick, so as in the outer swing of the picker stick to contact therewith shortly before the picker stick reaches the outward limit of its throw. The adjustment of the member 9 may be such that it rides along the under face of the prolongation 7 without substantial flexing of the latter, but with sufficient friction to bring the picker stick to a position of absolute rest at a predetermined point. If desired, the said member 9 may be so positioned that when it contacts with the prolongation 7, it flexes the same more or less upwardly, thus insuring greater friction between the said member 9 and the prolongation 7.

It will be observed that the construction and relation of parts are such that the member 9 contacts with the under side of the prolongation 7 when said parts are in a position at substantially right angles to each other. Not only does the picker stick function as stated, but it also holds the shoe 4 of the picker stick in proper position with respect to its support.

Viewing particularly Figs. 3 and 4, it will be observed that the member 5 with its prolongation 7 is so positioned with respect to the stud or pin 9 as to permit lateral centering movement of the picker stick 3 with respect to the shuttle. This permits the accurate throw of the shuttle. In order to secure the best results, it is important that the picker stick be not directly engaged at either face thereof by a checking device, as the result would be to deflect the picker stick laterally and thus to move it out of proper relation to the shuttle. In the disclosed embodiment of my invention the frictionally engageable members 7 and 9 are so related as to permit self-adjusting, lateral movements of the picker stick.

In the disclosed embodiment of the invention the frictionally engageable members are so located as in operation to effect transmission of downward pressure to the picker stick, thus tending to maintain the shoe or other lower portion of the picker stick in proper position with respect to its support. Thus, the picker check not only permits in operation lateral centering action of the picker stick, but pressure is transmitted downwardly to the picker stick.

A picker stick constructed in accordance with my invention is of exceedingly simple character and of few parts, but in practice brings the picker stick to a position of absolute rest at a predetermined point and with the point of the shuttle in contact therewith.

Having thus described one illustrative embodiment of my invention, I desire it to be understood that although specific terms are employed, they are used in a generic and descriptive sense and not for purposes of limitation, the scope of the invention being set forth in the following claims.

Claims:

1. In a loom, a lay, a picker stick, and a frictionally acting picker check therefor comprising two members respectively mounted upon the lay and the picker stick, the member on the picker stick having a surface extending in a direction laterally away from said stick and the member on the lay extending from the latter and to frictionally engage said laterally extending surface.

2. In a loom, a lay, a picker stick, and a frictionally acting picker check therefor comprising two members respectively mounted upon the lay and the picker stick, the member on the picker stick having a surface extending in a direction laterally away from the said stick and the member on the lay extending from the latter toward the outward position of said stick, to frictionally engage said surface and to be upwardly flexed by said frictional engagement.

3. In a loom, a lay, a picker stick, and a frictionally acting picker check therefor comprising two members respectively mounted upon the lay and the picker stick, the member on the picker stick extending substantially horizontally transversely to the path of movement of the stick and the member on the lay being positioned to engage a substantially horizontal face of said transversely extending member.

4. In a loom, a lay, a picker stick and a frictionally acting picker check therefor comprising two members respectively mounted upon the lay and the picker stick, the member on the picker stick being positioned under the member on the lay and having a path of movement that intercepts said member on the lay so as frictionally to engage therewith.

5. In a loom, a lay, a picker stick and a frictionally acting picker check therefor comprising two members respectively mounted upon the lay and the picker stick, the member on the picker stick being positioned under the member on the lay and having a path of movement that intercepts said member on the lay near the limit of outward movement of the stick, so as frictionally to engage therewith.

6. In a loom, a lay, a picker stick, and a frictionally acting picker check therefor comprising two members respectively mounted upon the lay and the picker stick, the member on the lay having a head 5 secured to the lay and flexible extension 7 and the member on the picker stick being positioned to engage said extension 7.

7. In a loom, a lay, a picker stick, and a frictionally acting picker check therefor comprising two members respectively mounted upon the lay and the picker stick, the member upon the lay being flexible, and said members being so located that when frictionally engaged said lay member is upwardly flexed.

8. In a loom, a lay, a picker stick, and a frictionally acting picker check therefor comprising two members respectively mounted upon the lay and the picker stick, the member upon the lay being above that on the picker stick, and said members being so located that when frictionally engaged downward pressure is thereby imparted to the picker stick.

9. In a loom, a lay, a picker stick, and a frictionally acting picker check therefor comprising two members respectively mounted upon the lay and the picker stick, said member upon the picker stick extending laterally therefrom and the member on the lay being so positioned as frictionally to engage an upwardly facing surface of said picker stick member.

10. In a loom, a lay, a picker stick, and a frictionally acting picker check therefor comprising two members respectively mounted upon the lay and the picker stick, said member upon the picker stick extending laterally therefrom and the member on the lay being so positioned as frictionally to engage a laterally extending surface of said picker member.

11. In a loom, a lay, a picker stick, and a frictionally acting picker check therefor comprising two members respectively mounted upon the lay and the picker stick, said members being so positioned as frictionally to engage each other, the member on the lay extending at a downward inclination and being flexible upwardly.

12. In a loom, a lay, a picker stick, and a frictionally acting picker check therefor comprising two members respectively mounted upon the lay and the picker stick, the member on the picker stick having a surface extending in a direction laterally away from said stick and the member on the lay extending from the latter and to frictionally engage said laterally extending surface, and means relatively to adjust said two members.

13. In a loom, a lay, a picker stick, and a frictionally acting picker check therefor comprising two members respectively mounted upon the lay and the picker stick, the member on the picker stick extending transversely to the path of movement of the stick and the member on the lay being positioned to engage frictionally the upper face of said picker stick member, and means relatively to adjust said two members.

14. In a loom, a lay, a picker stick, and a frictionally acting picker check therefor comprising two members respectively mounted upon the lay and the picker stick, the member on the lay being flexible and positioned to be engaged and upwardly flexed by the member on the stick, said lay member being non-concentric with the pivot of the picker stick, whereby said members frictionally engage near the termination of the outward throw of the picker stick.

15. In a loom, a lay, a picker stick, and a frictionally acting picker check therefor comprising two members respectively mounted upon the lay and the picker stick, said members being positioned to be frictionally engaged during the movement of the picker stick and said lay member being laterally spaced from the path of movement of the picker stick.

16. In a loom, a lay, a picker stick, and a frictionally acting picker check therefor comprising two members respectively mounted upon the lay and the picker stick, said lay member being mounted for a movement of flexure in a vertical plane, and the member on the picker stick being mounted frictionally to engage therewith, and thereby to impart said movement of flexure thereto in said plane.

17. In a loom, a lay, a picker stick, and a frictionally acting picker check therefor comprising two members respectively mounted upon the lay and the picker stick, one of said members being mounted for a movement of flexure in a vertical plane, and the other member being mounted frictionally to engage therewith and thereby to impart said movement of flexure in said plane.

In testimony whereof, I have signed my name to this specification, in the presence of two subscribing witnesses.

JESSE WHITWORTH.

Witnesses:
ALFRED R. T. NEEDHAM,
EVERETT S. EMERY.

Copies of this patent may be obtained for five cents each, by addressing the "Commissioner of Patents. Washington, D. C."